(12) United States Patent
Ryall et al.

(10) Patent No.: US 11,615,162 B2
(45) Date of Patent: Mar. 28, 2023

(54) EVENT LISTENING INTEGRATION IN A COLLABORATIVE ELECTRONIC INFORMATION SYSTEM

(71) Applicant: ATLASSIAN PTY LTD, Sydney (AU)

(72) Inventors: Matt Ryall, Sydney (AU); Bill Arconati, Sydney (AU); Sherif George Mansour, Sydney (AU); Shihab Hassan Hamid, Sydney (AU); Michael Alexander Cannon-Brookes, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 0 days.

(21) Appl. No.: 16/985,931

(22) Filed: Aug. 5, 2020

(65) Prior Publication Data

US 2021/0072867 A1  Mar. 11, 2021

Related U.S. Application Data (63) Continuation of application No. 16/020,838, filed on Jun. 27, 2018, now Pat. No. 10,761,675, which is a
(Continued)

(51) Int. Cl.
*G06F 16/95* (2019.01)
*G06F 3/048* (2013.01)
(Continued)

(52) U.S. Cl.
CPC ........ *G06F 16/9577* (2019.01); *G06F 3/0481* (2013.01); *G06F 40/106* (2020.01);
(Continued)

(58) Field of Classification Search
CPC .. G06F 16/9577; G06F 3/0481; G06F 40/166; G06F 40/14; G06F 40/106;
(Continued)

(56) References Cited

U.S. PATENT DOCUMENTS 5,737,442 A   4/1998  Alam
6,424,354 B1  7/2002  Matheny
(Continued)

OTHER PUBLICATIONS

3 Free Gmail Desktop Notification Software For Windows, Nov. 2013, pp. 1-5 https://www.ilovefreesoftware.com/21/windows/3-free-gmail-desktop-notification-software-windows.html (Year: 2013).*
(Continued)

*Primary Examiner* — Scott T Baderman
*Assistant Examiner* — Mario M Velez-Lopez
(74) *Attorney, Agent, or Firm* — Brownstein Hyatt Farber Schreck, LLP (57) ABSTRACT

In an embodiment, a computer-implemented data processing method comprises, in a collaborative electronic information management system that is hosted using a collaboration computer, establishing operation of a plurality of event listener units, wherein each of the event listener units is configured to communicate with or listen for a plurality of application events that have been generated by a particular corresponding external application; determining that one or more of the application events relate to a particular content item from among a plurality of content items that are managed in the system; generating and causing displaying, as a part of a graphical user interface of the system for a user account associated with a user computer, a set of notifications comprising one or more first notifications generated from the system and one or more second notifications that are based upon the application events, in association with data identifying the particular content item.

20 Claims, 7 Drawing Sheets

Related U.S. Application Data continuation of application No. 14/185,386, filed on Feb. 20, 2014, now Pat. No. 10,146,394.

(60) Provisional application No. 61/767,654, filed on Feb. 21, 2013.

(51) Int. Cl.

| | |
|---|---|
| *G06F 16/957* | (2019.01) |
| *G06Q 10/10* | (2023.01) |
| *G06Q 10/1093* | (2023.01) |
| *G06F 40/106* | (2020.01) |
| *G06F 40/166* | (2020.01) |
| *G06F 40/14* | (2020.01) |
| *H04L 65/403* | (2022.01) |
| *G06F 3/0481* | (2022.01) |

(52) U.S. Cl.
CPC ............ *G06F 40/14* (2020.01); *G06F 40/166* (2020.01); *G06Q 10/10* (2013.01); *G06Q 10/103* (2013.01); *G06Q 10/1097* (2013.01); *H04L 65/403* (2013.01); *H05K 999/99* (2013.01)

(58) Field of Classification Search
CPC .. G06Q 10/10; G06Q 10/103; G06Q 10/1097; H04L 65/403; H05K 999/99
See application file for complete search history.

(56) References Cited

U.S. PATENT DOCUMENTS

| | | | |
|---|---|---|---|
| 9,117,058 B1 | 8/2015 | Ansari | |
| 9,971,468 B2 | 5/2018 | Ryall et al. | |
| 10,146,394 B2* | 12/2018 | Ryall | G06Q 10/10 |
| 10,616,150 B2* | 4/2020 | Faulkner | H04L 12/1818 |
| 10,908,793 B2* | 2/2021 | Latzina | G06F 3/0481 |
| 11,240,247 B2* | 2/2022 | Jain | G06F 9/468 |
| 11,314,563 B1 | 4/2022 | Singh et al. | |
| 2002/0174183 A1 | 11/2002 | Saeidi | |
| 2003/0229859 A1 | 12/2003 | Shiraishi | |
| 2004/0015781 A1 | 1/2004 | Brown | |
| 2004/0123186 A1 | 6/2004 | Kulp | |
| 2005/0243371 A1 | 11/2005 | Kanaya | |
| 2006/0069989 A1 | 3/2006 | Jones | |
| 2007/0124285 A1 | 5/2007 | Wright et al. | |
| 2008/0235585 A1 | 9/2008 | Hart | |
| 2009/0260022 A1 | 10/2009 | Louch | |
| 2009/0327850 A1 | 12/2009 | Obrecht et al. | |
| 2010/0095197 A1 | 4/2010 | Klevenz | |
| 2010/0318924 A1 | 12/2010 | Frankel et al. | |
| 2011/0004845 A1 | 1/2011 | Ciabarra | |
| 2011/0010641 A1* | 1/2011 | Wolff | G06Q 10/107 715/753 |
| 2011/0126123 A1 | 5/2011 | Reter | |
| 2011/0205594 A1 | 8/2011 | Chida | |
| 2011/0212430 A1* | 9/2011 | Smithmier | G09B 5/06 434/322 |
| 2011/0225526 A1 | 9/2011 | Baret | |
| 2011/0264705 A1 | 10/2011 | Diamond | |
| 2011/0307883 A1* | 12/2011 | Hilerio | G06F 9/451 715/810 |
| 2012/0032945 A1* | 2/2012 | Dare | G06F 3/0488 345/418 |
| 2012/0036442 A1* | 2/2012 | Dare | G06F 8/60 715/736 |
| 2012/0079004 A1 | 3/2012 | Herman | |
| 2012/0102114 A1 | 4/2012 | Dunn | |
| 2012/0254717 A1 | 10/2012 | Peters | |
| 2012/0295648 A1* | 11/2012 | Naaman | H04W 4/027 455/500 |
| 2012/0296919 A1 | 11/2012 | Sinha | |
| 2013/0024511 A1 | 1/2013 | Dunn | |
| 2013/0091149 A1 | 4/2013 | Dunn | |
| 2013/0205246 A1 | 8/2013 | Schmidt et al. | |
| 2013/0218845 A1 | 8/2013 | Kleppner | |
| 2013/0254699 A1 | 9/2013 | Bashir | |
| 2013/0311890 A1 | 11/2013 | Cui | |
| 2014/0053060 A1 | 2/2014 | Walker | |
| 2014/0082525 A1 | 3/2014 | Kass | |
| 2014/0173451 A1 | 6/2014 | Klaka | |
| 2014/0201289 A1 | 7/2014 | Wheeler et al. | |
| 2014/0237350 A1 | 8/2014 | Ryall et al. | |
| 2014/0237387 A1 | 8/2014 | Ryall | |
| 2014/0237388 A1 | 8/2014 | Ryall | |
| 2014/0237389 A1 | 8/2014 | Ryall | |
| 2014/0237420 A1* | 8/2014 | Song | G06F 3/04817 715/788 |
| 2017/0090704 A1 | 3/2017 | Hu et al. | |
| 2017/0185687 A1 | 6/2017 | Pai et al. | |
| 2017/0220361 A1* | 8/2017 | Sharma | H04W 88/02 |
| 2017/0318020 A1 | 11/2017 | Kamath et al. | |
| 2018/0284949 A1 | 10/2018 | Ryall | |
| 2018/0307382 A1 | 10/2018 | Ryall | |
| 2020/0090452 A1* | 3/2020 | Higgins | G07F 17/3232 |
| 2020/0226118 A1 | 7/2020 | Beechuk et al. | |
| 2020/0364256 A1* | 11/2020 | King | G06Q 10/109 |
| 2021/0124561 A1 | 4/2021 | Pezaris et al. | |
| 2021/0160201 A1 | 5/2021 | Phan et al. | |

OTHER PUBLICATIONS

Ryall, U.S. Appl. No. 14/185,386, filed Feb. 20, 2014, Notice of Allowance, dated Sep. 13, 2018.
Ryall, U.S. Appl. No. 14/185,349, filed Feb. 20, 2014, Notice of Allowance, dated Dec. 29, 2017.
Ryall, U.S. Appl. No. 14/185,349, filed Feb. 20, 2014, Office Action, dated Jun. 9, 2017.
Ryall, U.S. Appl. No. 14/185,374, filed Feb. 20, 2014, Interview Summary, dated Apr. 27, 2017.
Ryall, U.S. Appl. No. 14/185,374, filed Feb. 20, 2014, Final Office Action, dated Mar. 28, 2017.
Ryall, U.S. Appl. No. 14/185,374, filed Feb. 20, 2014, First Office Action Interview, dated Nov. 28, 2016.
Ryall, U.S. Appl. No. 14/185,374, filed Feb. 20, 2014, Interview Summary, dated Jan. 17, 2017.
Ryall, U.S. Appl. No. 14/185,379, filed Feb. 20, 2014, Advisory Action, dated Jun. 15, 2017.
Ryall, U.S. Appl. No. 14/185,379, filed Feb. 20, 2014, Final Office Action, dated Mar. 9, 2017.
Ryall, U.S. Appl. No. 14/185,379, filed Feb. 20, 2014, Final Office Action, dated Sep. 7, 2017.
Ryall, U.S. Appl. No. 14/185,379, filed Feb. 20, 2014, Office Action, dated Nov. 16, 2017.
Ryall, U.S. Appl. No. 14/185,379, filed Feb. 2, 2014, Office Action, dated Nov. 26, 2017.
Ryall, U.S. Appl. No. 14/185,349, filed Feb. 20, 2014, Final Office Action, dated Mar. 30, 2017.
Ryall, U.S. Appl. No. 14/185,386, filed Feb. 20, 2014, Notice of Allowance, dated Feb. 28, 2018.
U.S. Appl. No. 14/185,386, filed Feb. 20, 2014, First Office Action Interview, dated Mar. 21, 2016.
Ryall, U.S. Appl. No. 14/185,386, filed Feb. 20, 2014, Office Action, dated Mar. 1, 2017.
Ryall, U.S. Appl. No. 15/937,541, filed Mar. 27, 2018, Notice of Allowance, dated Jan. 10, 2019.
Ryall, U.S. Appl. No. 15/937,541, filed Mar. 27, 2018, Office Action, dated Aug. 31, 2018.
Ryall, U.S. Appl. No. 16/020,838, filed Jun. 27, 2018, Notice of Allowance, dated Apr. 27, 2020.
Ryall, U.S. Appl. No. 16/020,838, filed Jun. 27, 2018, Office Action, dated Mar. 13, 2020.
U.S. Appl. No. 14/185,349, filed Feb. 20, 2014, First Office Action Interview, dated Sep. 13, 2016.
U.S. Appl. No. 14/185,379, filed Feb. 20, 2014, First Office Action Interview, dated Oct. 6, 2016.
U.S. Appl. No. 14/185,379, filed Feb. 20, 2014, Office Action, dated Jul. 13, 2017.

(56) References Cited

OTHER PUBLICATIONS

U.S. Appl. No. 14/185,386, filed Feb. 20, 2014, Advisory Action, dated Oct. 12, 2016.
U.S. Appl. No. 14/185,386, filed Feb. 20, 2014, Final Office Action, dated Jul. 20, 2017.
U.S. Appl. No. 14/185,386, filed Feb. 20, 2014, Final Office Action, dated Aug. 4, 2016.
Ryall, U.S. Appl. No. 14/185,386, fled Feb. 20, 2014, Adviosry Action, dated Sep. 28, 2017.
O'Reilly Media, "Front Page 2003, The Missing Manual", dated Aug. 18, 2005, 11 pages. Https://books.google.com/books?id=VtC7tdu71EwC&dq=frontpage+slip+view+option&source=gbs_navlinks_s.
Frontpage Templates, buytemplates.net as available Feb. 13, 2013, 4 pages.

* cited by examiner

EVENT LISTENING INTEGRATION IN A COLLABORATIVE ELECTRONIC INFORMATION SYSTEM

BENEFIT CLAIM

This application claims the benefit under 35 U.S.C. § 120 as a continuation of application Ser. No. 16/020,838, filed Jun. 27, 2018, which is a continuation of application Ser. No. 14/185,386, filed Feb. 20, 2014, now U.S. Pat. No. 10,146,394, which claim the benefit under 35 U.S.C. § 119(e) of U.S. Provisional Application No. 61/767,654, filed Feb. 21, 2013, the entire contents of which is hereby incorporated by reference for all purposes as if fully set forth herein.

FIELD OF THE DISCLOSURE

The present disclosure generally relates to computer-implemented techniques for supporting notifications, approval indications, and event communication in electronic information management systems that promote collaborative communication. The disclosure relates more specifically to techniques for listening to external events, displaying notifications in a graphical user interface, and receiving and storing approval indications.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-based collaborative information sharing systems enable teams of computer users, who may be widely geographically dispersed, to create, update, and manage electronic documents using a federated system. An example system is CONFLUENCE, commercially available from Atlassian of Sydney, Australia. However, users of collaborative information sharing systems also typically use other computer program applications for other purposes; for example, these users may separately interact with an e-mail client program or web-based mail inbox, documents containing personal tasks or work tasks, calendars and other systems. These other applications may generate alerts, notifications or other events that require the attention of the user. Consequently, computer users typically are required to repeatedly change their attention from interacting with the collaborative information sharing system to one or more of the other applications. The result is an excessive amount of mentally disruptive context switching, and inefficiency incurred in switching between applications.

A related issue in this context is that the collaborative information sharing systems typically have been managed separately without awareness of the events that are generated in external systems such as e-mail, task managers or calendars and without a facility to receive or interpret these events.

Users of a collaborative information sharing system also may wish to express approval for a particular comment, document, task or other item that has been created by another user of the system. In the past, expressing approval typically has required the user to enter a new comment or reply comment in the system, which may require more time than the user wishes to spend to express approval.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. Overview

In an embodiment, a data processing method comprises receiving, in a collaborative electronic information management system that is hosted using a collaboration computer, a plurality of application events that have been generated by a plurality of external applications; determining that one or more of the application events relate to a particular content item from among a plurality of content items that are managed in the system; generating and causing displaying, as a part of a graphical user interface of the system for a user account associated with a user computer, a set of notifications comprising one or more first notifications generated from the system and one or more second notifications that are based upon the application events, in association with data identifying the particular content item.

In another embodiment, a computer-implemented data processing method comprises receiving, in a collaborative electronic information management system that is hosted using a collaboration computer, a plurality of application events that have been generated by a plurality of external applications; determining that one or more of the application events relate to a particular content item from among a plurality of content items that are managed in the system;

generating and causing displaying, as a part of a graphical user interface of the system for a user account associated with a user computer, a set of notifications comprising one or more first notifications generated from the system and one or more second notifications that are based upon the application events, in association with data identifying the particular content item; receiving third input indicating selection of an approval control that is displayed in association with the data identifying the particular content item, and in response, updating the tasks-notifications sub panel to indicate an approval of the particular content item; receiving third input indicating selection of an approval control that is displayed in association with the particular notification, and in response, updating the tasks-notifications sub panel to indicate an approval of the particular notification.

In an embodiment, a computer-implemented data processing method comprises, in a collaborative electronic information management system that is hosted using a collaboration computer, establishing operation of a plurality of event listener units, wherein each of the event listener units is configured to communicate with or listen for a plurality of application events that have been generated by a particular corresponding external application; determining that one or more of the application events relate to a particular content item from among a plurality of content items that are managed in the system; generating and causing displaying, as a part of a graphical user interface of the system for a user account associated with a user computer, a set of notifications comprising one or more first notifications generated from the system and one or more second notifications that are based upon the application events, in association with data identifying the particular content item.

2. Example Embodiments 2.1 Structural and Functional Overview

Figure 1:
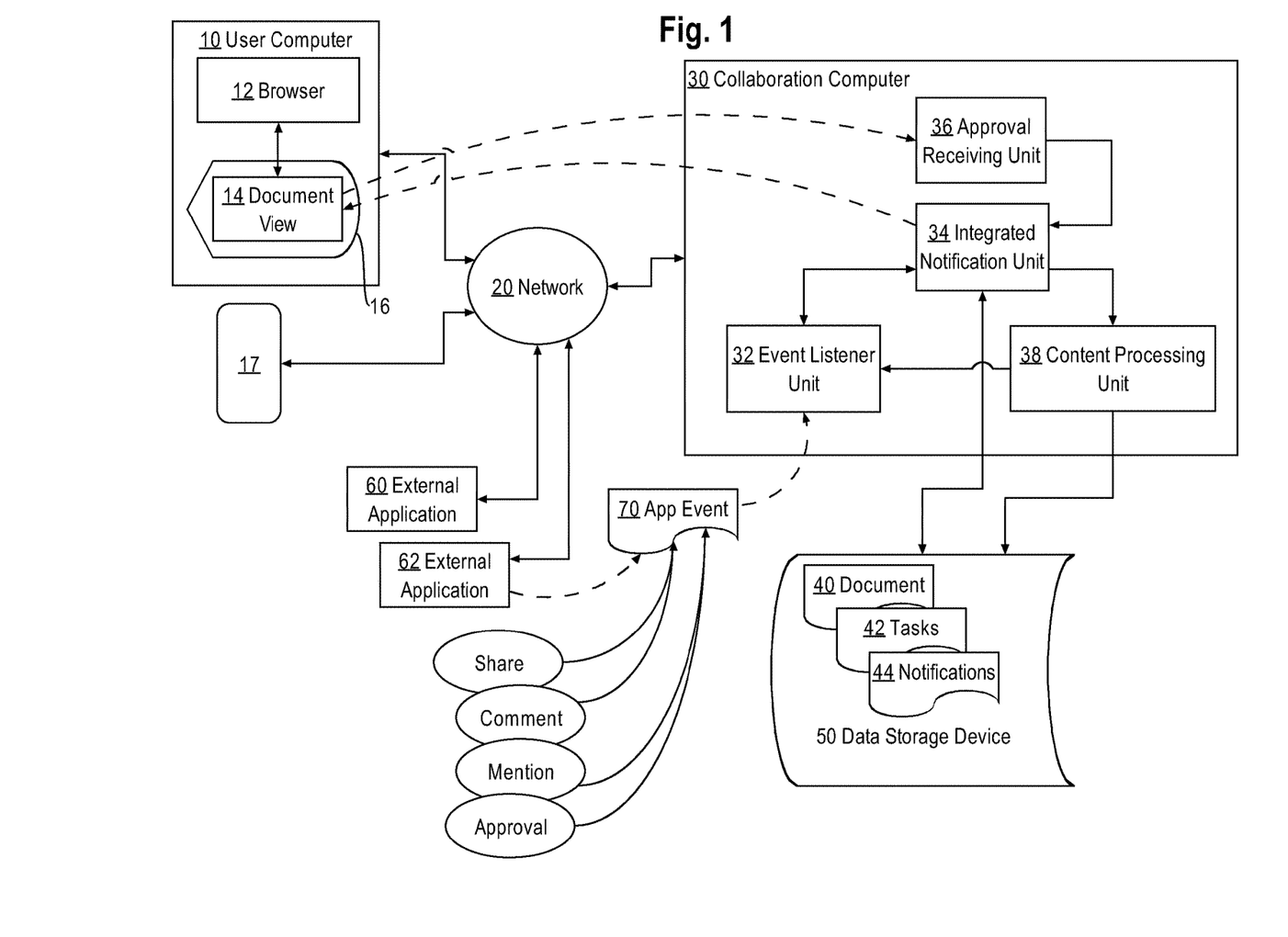
FIG. 1 illustrates an example networked computer system with which an embodiment may be implemented.
Figure 2:
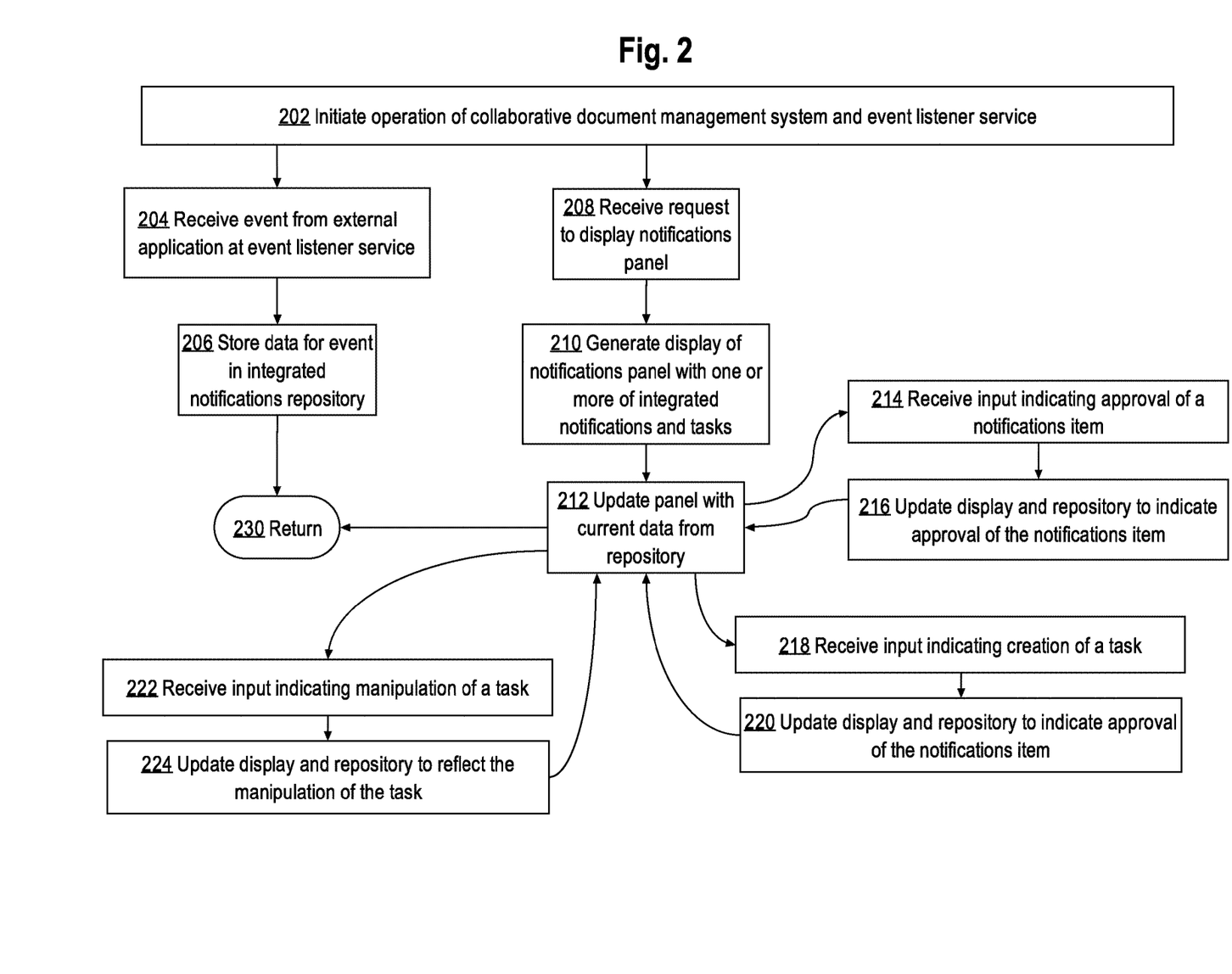
FIG. 2 illustrates aspects of an asynchronous data processing method that may be used to process external application events, notifications panels, and approvals or other interactions with the notification panel.
Figure 3:
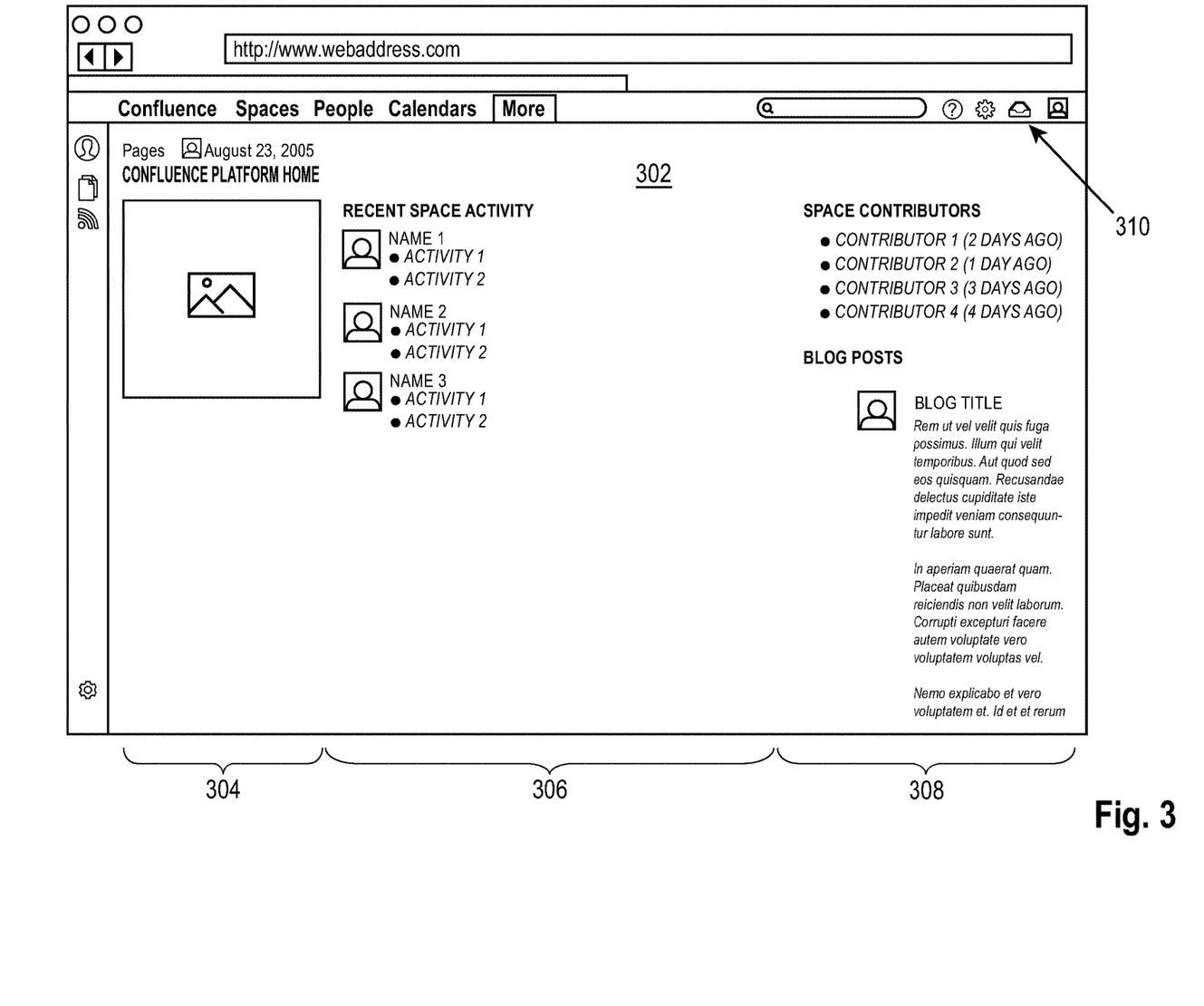
FIG. 3 illustrates an example graphical user interface that may be generated for collaborative interaction with a set of electronic documents, messages and notifications.
Figure 4:
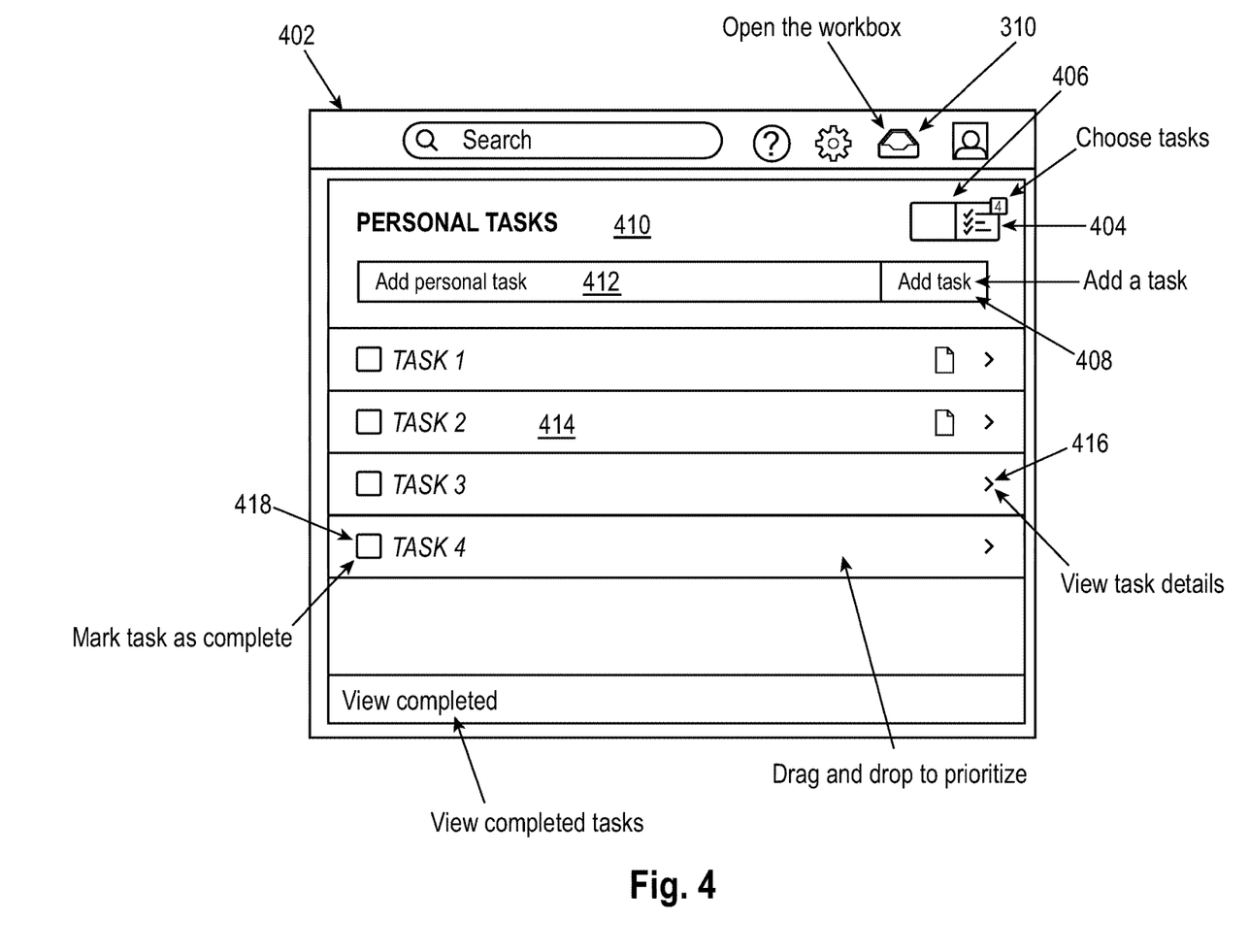
FIG. 4 illustrates an example notification-task panel that may be displayed using an embodiment, and including a set of tasks.
Figure 5:
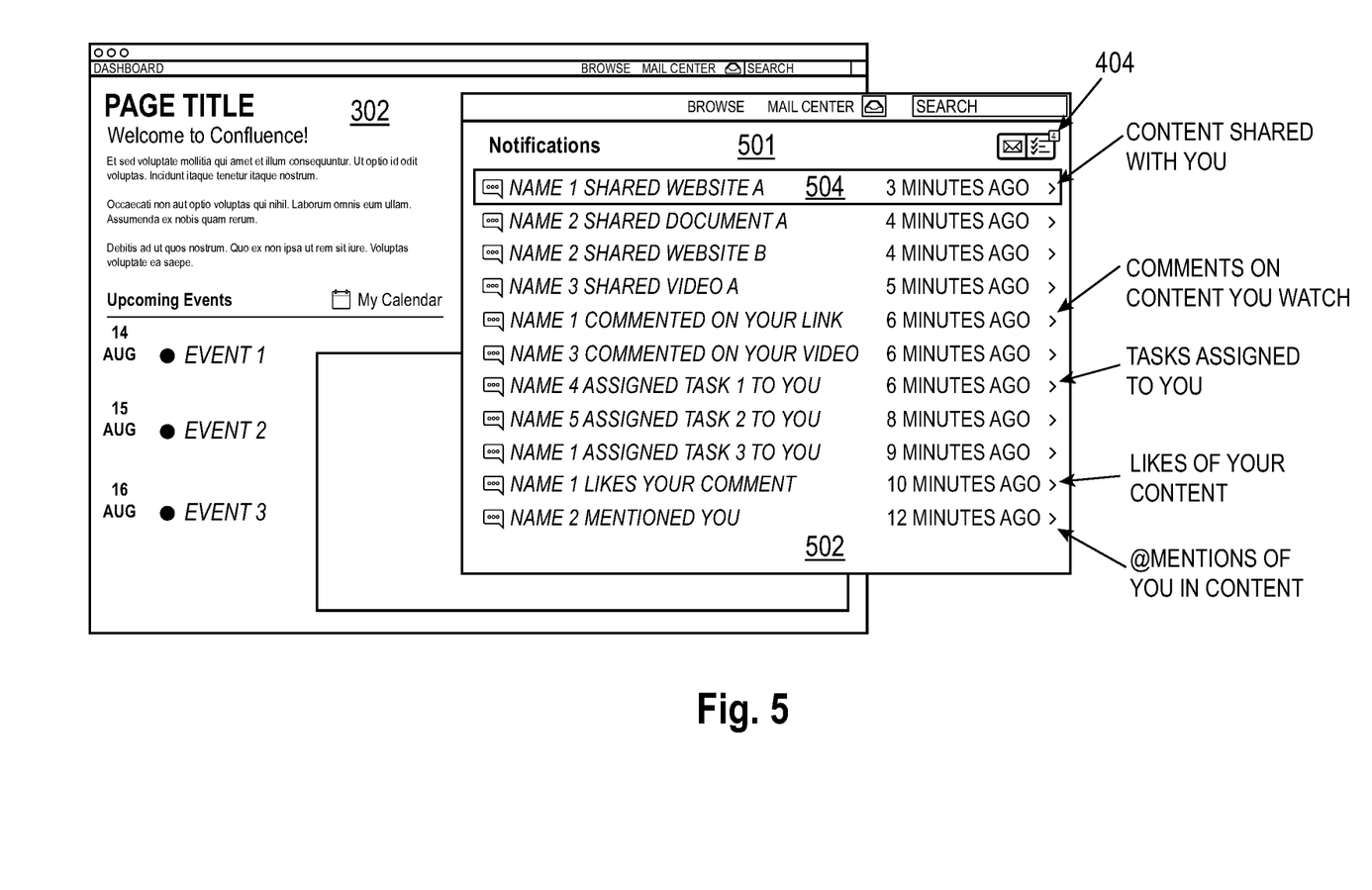
FIG. 5 illustrates an example graphical user interface that may be generated for collaborative interaction with a set of electronic documents, messages and notifications, with superimposition of an example notification-task panel that may be displayed using an embodiment, and including a set of notifications.
Figure 7:
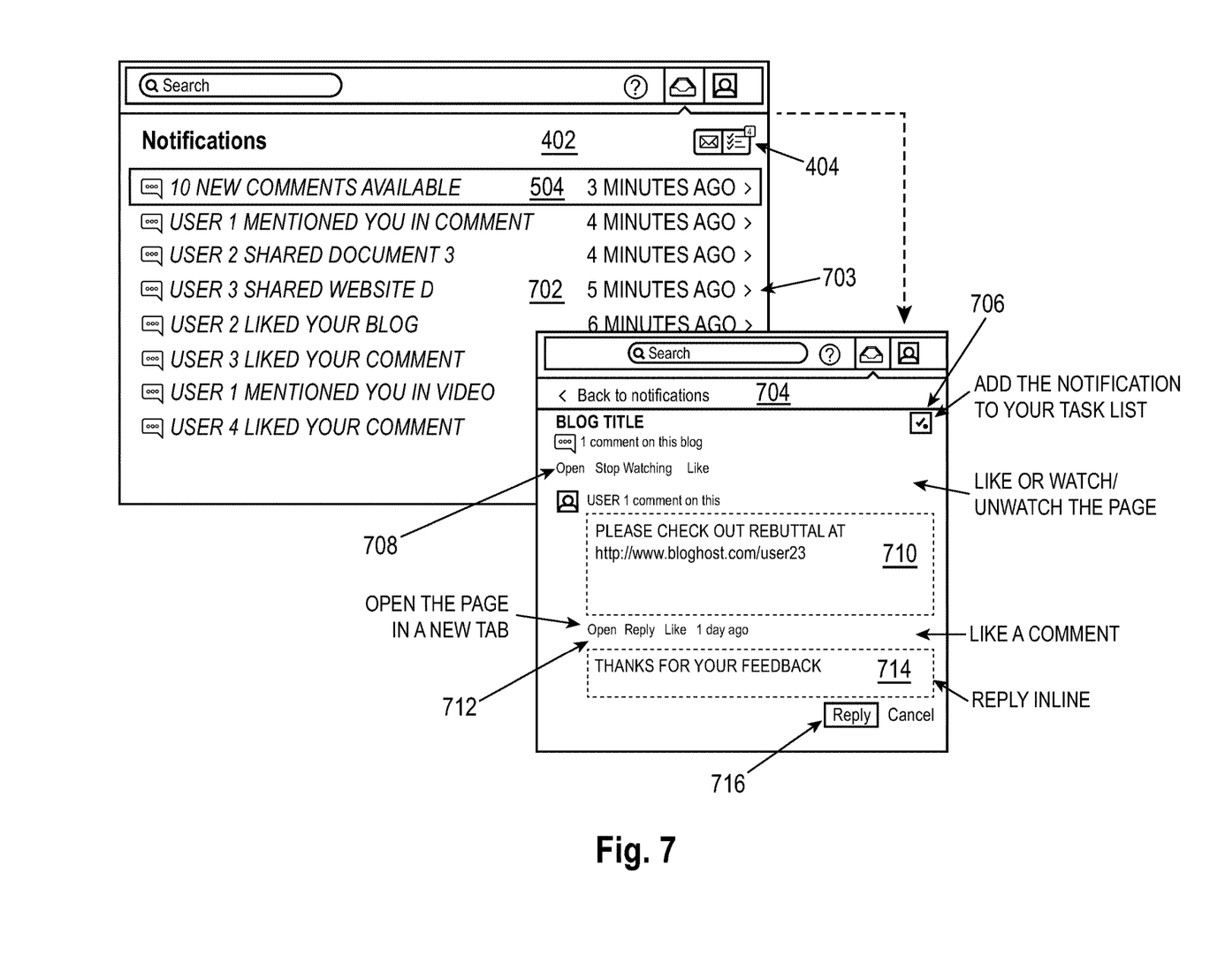
FIG. 7 illustrates an example of the notification-task panel of FIG. 5, with superimposition of a notification sub panel that includes a comment.

FIG. 1 illustrates an example networked computer system with which an embodiment may be implemented; FIG. 2 illustrates aspects of an asynchronous data processing method that may be used to process external application events, notifications panels, and approvals or other interactions with the notification panel; FIG. 3 illustrates an example graphical user interface that may be generated for collaborative interaction with a set of electronic documents, messages and notifications; FIG. 4 illustrates an example notification-task panel that may be displayed using an embodiment, and including a set of tasks; FIG. 5 illustrates an example graphical user interface that may be generated for collaborative interaction with a set of electronic documents, messages and notifications, with superimposition of an example notification-task panel that may be displayed using an embodiment, and including a set of notifications; FIG. 7 illustrates an example of the notification-task panel of FIG. 5, with superimposition of a notification sub panel that includes a comment. For convenience and to illustrate a clear example, FIG. 1 and FIG. 2 are described concurrently, and the example process of FIG. 2 is described in the specific context of FIG. 3, FIG. 4, FIG. 5, and FIG. 7, but other embodiments may implement the approach of FIG. 2 in contexts other than those of FIG. 1 and FIG. 3-7. In one aspect, the system and processes described in these figures provides a federated notification and task generating system in which external applications may provide events that are transformed into notifications within an application that provides the end user's current context, so that the user can view the notifications, create tasks, and activate actions in the external applications without leaving that context.

Referring first to FIG. 1, in an embodiment, a user computer 10 is coupled directly or indirectly through one or more networks 20 to a collaboration computer 30 that is coupled to or can access a data storage device 50. User computer 10 may comprise any computing device such as a personal computer, workstation, tablet computer or smartphone. For example, a mobile computing device such as a smartphone 17 may serve as the user computer 10. User computer 10 hosts or executes a browser 12, which may comprise a commercially available web browser program such as FIREFOX, SAFARI, CHROME, etc. Browser 12 is capable of generating a document view 14 on a display device 16 of the user computer 10; in this context, the document view represents the fully rendered visual appearance of an electronic document. An example of an electronic document is an HTML document or web page.

Network 20 broadly represents one or more local or wide area networks and/or internetworks, using any of wired, wireless, terrestrial, microwave or satellite links.

Collaboration computer 30 may comprise any computing device having resources sufficient to execute the functions that are described herein and may comprise, in various embodiments, a server computer, workstation, one or more virtual machine instances in a data center or cloud computing infrastructure, or a combination. In an embodiment, the collaboration computer 30 hosts an integrated notification unit 34 that is coupled to an event listener unit 32, approval receiving unit 36, and content processing unit 38. In this embodiment, browser 12 connects to collaboration computer 30 and interacts with one or more of the functional units of collaboration computer 30 as a service. In practice, a large number of different user computers 10 may concurrently connect to the collaboration computer 30, or multiple instances of the functional units of the collaboration computer, to accomplish distributed collaborative interaction with electronic documents. For example, widely geographically dispersed teams having different user computers 10 in diverse locations can be coupled concurrently through networks to the collaboration computer 30 to concurrently view, add, delete, manage, and change content that the collaboration computer makes available. These teams and applications they use may be the source of events that are transformed into and presented as federated notifications via the collaboration computer 30 and browser 12, as further described.

Integrated notification unit 34 comprises, in various embodiments, one or more computer programs, other software elements, or other digital logic or functional units that are configured to perform the event processing, notification display, and approval functions that are further described herein. Approval receiving unit 36 comprises, in one embodiment, one or more computer programs, other software elements, or other digital logic or functional units that are configured to perform the functions described herein relating to receiving input, displaying, and processing indications that an item is approved or liked.

Event listener unit 32 comprises, in various embodiments, one or more computer programs, other software elements, or other digital logic or functional units that are configured to perform the event receiving and posting functions that are described further herein. For purposes of illustrating a clear example, FIG. 1 shows a single event listener 32, but in practical embodiments, there may be any number of event listeners corresponding to different external applications 60, 62. For example, the collaboration computer 30 may implement an event listener 32 specifically for the JIRA application that is configured to specifically listen for events in that application and then provide the events to content processing unit 38 for preparation as federated in-app notifications within a collaborative document management system as further described.

The content processing unit 38 comprises, in various embodiments, one or more computer programs, other software elements, or other digital logic or functional units that are configured to perform the content processing functions that are described herein including managing creating content, sharing content, receiving and distributing comments on content and mentions of a user or computer in connection with content, receiving and processing approval indications, and other functions.

In an embodiment, data storage device 50 stores one or more representations of an electronic document 40, tasks 42, and notifications 44, in addition to metadata relating to the foregoing. Document 40 represents, in FIG. 1, a representation of the web page that is managed in memory of the collaboration computer 30 and corresponds to document view 14.

In one embodiment, using the content processing unit 38 a user interface display may be generated to represent a web page having one or more sections, columns and other layout features and containing human perceivable content such as text and graphics that a plurality of users or user computers may create, update, and manage. Sections are horizontal areas and columns are vertical areas. To add structure to the information on a page, it is often useful to split the information into columns. It is often desirable to have more than one column across the width of the page. A user may also want to use a common structure on a number of pages, so that readers know where to find the information within each page. In addition to columns, sections are useful to organize content and a section may contain one or more columns. Embodiments provide a set of predefined page layouts. Each layout provides one or more columns. Some layouts also provide a horizontal block at the top and bottom of the page. The layout that is selected determines the position of the sections and columns on the page, as well as the relative width of the columns. The page's content is confined within the borders of the layout. In one embodiment, the user cannot add content above or below the sections and columns provided by the layout.

Data storage device 50 represents one or more elements of data storage that may be co-located with collaboration computer 30, or in a storage area network, or in remote networked data storage, in various embodiments. Both collaboration computer 30 and data storage device 50 may comprise instances of processing and data storage resources that are in a remote data center or cloud-based computing infrastructure.

In an embodiment, one or more external applications 60, 62 may be coupled to network 20 and accessible to collaboration computer 30. The external applications 60, 62 represent any software, service, system or computer that may act as a source of events, notifications or other data to the collaboration computer 30 and for which it is desirable to provide integration into content that the collaboration computer manages and the creation of federated notifications within the user's then-current application context to serve as the basis of generating tasks or activating actions in the external applications. In this context, the term "external" merely means separate from collaboration computer 30. Examples of external applications 60, 62 include collaborative software development applications such as JIRA, e-mail, social media applications such as FACEBOOK or TWITTER, databases, CRUCIBLE, BAMBOO, etc. Each of the applications 60, 62 comprises a source of one or more application events 70 and each may have an associated database.

As indicated by a phantom line from external application 62 to event listener unit 32, the one or more application events 70 are communicated from the external application 62 to the event listener unit 32 for consumption at integrated notification unit 34 and integration into content by content processing unit 38. Examples of application events 70 include content sharing, comments on content, mentions relating to content, approval indications such as likes, etc. In this context, a "mention" relating to content is a reference, in a first content item, to a second content item; for example, a first user might mention a particular wiki page in a different wiki page or other item of content. In some embodiments, application events 70 also may be received from other functional units, hosted within collaboration computer 30 or in federated systems or software. Examples of such associated events include content sharing, mentions, approvals, comments, etc. These events may come from the CONFLUENCE system, for example, hosted on collaboration computer 30.

Data storage device 50 is configured as a repository for a document 40, tasks 42, notifications 44 in any number or quantity. In a practical implementation, there may be millions of documents, tasks and notifications managed by collaboration computer 30. A benefit of the system of FIG. 1 is that sharing, comment, mention, and approval events 70 originating from external applications 60, 62 may be integrated into the document 40, tasks 42, notifications 44 that the collaboration computer 30 manages and may be presented within the same user interface or context as the content. Consequently, user computer 10 is not required to interact directly with the external applications 60, 62 or otherwise leave the user's then-current application context to view information relating to the application events 70; instead, the user may interact with a single user interface of the collaboration computer 30 to view data originated from a large number of other applications and to generate tasks and activate actions of the external applications. Moreover, there is no requirement for the external applications 60, 62 to have compatibility with the collaboration computer 30 or the content in data storage device 50.

FIG. 2 illustrates aspects of an asynchronous data processing method that may be used to process external application events, notifications panels, and approvals or other interactions with the notification panel.

At step 202, the process initiates operation of a collaborative document management system and event listener service. For example, step 202 may comprise collaboration computer 30 executing content processing unit 38, event listener unit 32, integrated notification unit 34, and approval receiving unit 36. In cooperation, these functional units provide a collaborative document management system with which a large number of users or user computers 10 can contribute content, such as document 40, tasks 42, notifications 44, in a shared view of a wiki, shared electronic document, or other shared content item. Further, the functional units provide a system capable of listening to application events 70 that originate from the external applications 60, 62 for integration into the content. In this context, the external applications 60, 62 and collaboration computer 30 form a federated system in which services offered by content processing unit 38 and the external applications 60, 62 appear in a single user interface, or otherwise appear to represent a fully integrated service, even though the external applications may originate from different vendors, enterprises or other sources as compared to the functional units of the collaboration computer 30.

At step 204, an event is received from an external application at the event listener service. For example, application event 70 is received from external applications 60, 62 at event listener unit 32. The application event 70 might comprise an approval indication from a social networking system, a comment from a database system, a sharing indication, a mention, etc., including events received from content processing unit 38. For example, the application event 70 may comprise a task that another user assigned to the current user from a task list that was displayed in a page of a collaborative document or wiki that the collaboration computer 30 is managing. Still further, other actions of the collaboration computer 30 may create a tasks for the current user computer 10; for example, the collaboration computer may be running a plugin that creates and assigns tasks.

The event listener service 32 is configured for compatibility with the application programming interface (API), messaging protocols, other outward-facing interfaces of the external applications 60, 62. For example, event listener service 32 may be configured to query a graph of a social media system to identify and obtain data for an approval indication, comment, share or mention of content. Event listener service 32 may be configured to periodically poll a data repository that one of the external applications 60, 62 manages to obtain newly created or updated records that represent content items, shares, comments, mentions or approvals. Thus, event listener service 32 may have a modular structure or a plug-in architecture in which elements or interfaces of the event listener service are compatible with particular ones of the applications 60, 62 and are used to obtain data from those applications as necessary to listen to all events or notifications that the external applications generate.

As part of step 204 or step 206, the process includes determining that one or more of the application events relate to a particular content item from among a plurality of content items that are managed in the system. In other words, an incoming application event from one of the external applications 60, 62 is automatically correlated to or associated with a particular content item that is managed in the system. Correlation may occur based upon a globally unique content item identifier that is specified in the application event, or heuristically based upon content item names, titles or other substantive content values that match content items that are managed in the system.

At step 206, data is stored for the event in an integrated notifications repository. For example, step 206 may involve forming a data record in data storage device 50 that represents one or more of a document 40, tasks 42, notifications 44 with content corresponding to the application event 70 that was received in step 204. As a result, a large number of diverse kinds of events and notifications from different external applications 60, 62 become federated in the system and accessible to collaboration computer 30.

At step 230, controls returns to a calling process or to continue asynchronous processing of events, requests, and other input. Thus, steps 204, 206 may represent one of a plurality of asynchronous tasks that the collaboration computer 30 processes continuously and in any order. Steps 204, 206 may be repeated any number of times for different events, at any time with respect to the other asynchronous tasks that the system processes.

At step 208, a request is received to display a notifications panel. The request of step 208 may comprise another kind of asynchronous task processed in the system. In one embodiment, the request of step 208 comprises a selection, using a pointing device such as a mouse, a touchpad, or a touch gesture on a touch-sensitive display device, that selects a user interface control configured to display a notifications panel. FIG. 3, FIG. 4, FIG. 5, FIG. 7 provide an example. FIG. 3 illustrates an example graphical user interface that may be generated for collaborative interaction with a set of electronic documents, messages and notifications. In an embodiment, a graphical user interface 302 comprises a first column 304 containing graphical content, a second column 306 containing comments and notifications, and a third column 308 comprising contributor data, blog posts and other information. GUI 302 further comprises a workbox control 310 which, when selected, causes generating and displaying a notifications-task panel 402 (FIG. 4) that is configured to display either a set of user-specific notifications or a set of user-specific tasks. For purposes of showing a clear example, the workbox control 310 is illustrated as part of a toolbar in a top region of the GUI 302 of FIG. 3, but in other embodiments, the workbox control 310 may be presented in other locations. In this context, the term "workbox" is suggestive or arbitrary and other labels may be used.

The source of data in the notifications may be the content processing unit 38—in other words, a part of the collaboration computer 30 that is integral to the system—or one or more of the external applications 60, 62.

At step 210, the process generates a display of a notifications panel with one or more of integrated notifications and tasks. At step 212, the process updates the panel with current data from the repository. FIG. 4, FIG. 5, FIG. 7 provide an example, and are described further in separate sections herein. In one embodiment, the notifications panel includes a list of notifications that were recently received from any of the external applications 60, 62 or from the functional units within collaboration computer 30, in similar formats and methods of presentation, so that all the notifications that are received from diverse systems appear federated and consistent. Step 212 represents retrieving recently updated records from data storage device 50 for newly received notifications and events; in other words, an aspect of responding to the request to generate a notifications-tasks panel is checking the data storage device and displaying data for recently updated records.

Steps 214 to 224 represent asynchronous events or input that may be received at the event listener service and other functional units of the system and processed in the manner indicated. Referring first to step 214, in an embodiment, the process receives input indicating approval of a notifications item. In this context, an indication of approval may be data indication a prior selection of a Like link in an external social media system or in a user interface presented by the collaboration computer 30. At step 216, in response, the process updates the display and repository to indicate an approval of the notifications item. Step 216 may include updating the data storage device 50 with a record, column update, or other marking indicating that a particular content item or notification was approved or Liked.

At step 218, the process receives input indicating creation of a task. Input indicating creation of a task may comprise selecting an Add Task control in the notifications panel, for example. At step 220, in response, the process updates the display and repository to indicate approval of the notifications item.

At step 222, input is received indicating manipulation of a task. Input indicating manipulation of a task may include any one or more of: input indicating marking a task as complete; input indicating moving a task to a different position in a task list thereby changing a priority of the task; input requesting viewing task details; input indicating a request to view only tasks that were previously marked as complete. At step 224, in response, the process updates the display and repository to reflect the manipulation of the task.

FIG. 4 illustrates an example notification-task panel that may be displayed using an embodiment, and including a set of tasks. FIG. 4 provides one example implementation of a federated set of tasks that can be generated based upon multiple events received from different external applications. In an embodiment, a notifications-task panel 402 comprises a personal tasks list 410 that comprises a set of zero or more tasks 414 associated with a particular user or user computer 410. In an embodiment, each of the tasks 414 comprises a single line of text and thus is a light-weight task, but in the embodiment of FIG. 4 or other embodiments there may be other detailed content associated with a task. In various embodiments, the tasks 414 may comprise personal notes that users may prioritize, and/or may be used as pointers to other items for action; for example, a task may link to a calendar that indicates a due date for a task.

The notifications-task panel 402 may comprise a notifications-task control 404 having a tasks button and a notifications button 406. In an embodiment, the notifications-tasks control 404 is configured to control two forms of display of the notifications-task panel; in a first display form, the panel comprises a list of tasks with associated controls, and in a second display form, the panel comprises a list of notifications with associated controls. FIG. 4 shows the first display form.

In an embodiment, the personal tasks list 410 further comprises a text entry field 412 in which user input may be provided for a new task. An add task control 408 is configured to cause adding a new task as indicated in the field 412 to the data storage device 50 using a new database record. Thus, entering data in field 412 and selecting control 408 causes updating the data storage device 50 with a new task. Further, in an embodiment each of the tasks 414 is a graphically movable item responsive to cursor control input, such as selection and dragging, to move the task into a different order within the list of all the tasks. In one embodiment, selecting and holding a button of a pointing device causes selecting the task 414 for movement and then the task may be dragged to a new position and released, causing updating the data storage device 50 with data indicating a new task order.

In an embodiment, each of the tasks 414 comprises a selection checkbox 418 which, when selected, causes marking the associated task as complete. Marking may comprise updating a column in a database record corresponding to the task. The column value may be used in filter operations, such as a request to view completed tasks, as a field for evaluating a query that requests displaying only completed tasks.

In an embodiment, each of the tasks 414 comprises a details control 416 which, when selected, causes displaying comments, a date-time value, or other metadata associated with a particular task.

The example of FIG. 4 includes tasks that a user of the user computer 10 may have created for that user, or that other users created. In an embodiment, tasks 414 are updated in the data storage device 50 continuously based upon other actions occurring in the system and therefore each display of the notifications-tasks panel 402 comprises a then currently updated set of tasks. For example, the application event 70 may comprise a task that another user assigned to the current user from a task list that was displayed in a page of a collaborative document or wiki that the collaboration computer 30 is managing. Still further, other actions of the collaboration computer 30 may create a tasks for the current user computer 10; for example, the collaboration computer may be running a plugin that creates and assigns tasks. When a user updates a task that originated in a task list on a page that the collaboration computer 30 is managing, the update is reflected in the tasks 414 of panel 402 also.

In an embodiment, content processing unit 38 (FIG. 1) may expose an API for task operations that supports CRUD actions using REST operations that map to Java methods. For example, a TaskService API may map REST operations such as GET, POST and DELETE, respectively to a find method, createOrUpdate method and delete method in Java. Each task may be identified in data storage device 50 using a globally unique identifier. Embodiments may also include a Notifications REST API providing a mechanism for receiving remotely generated application events in the system, and a Notification actions registration API, providing a mechanism for informing the notification processing system what actions to display both at the level of a remote object and remote notification. For example, an external app or remote application may register particular allowed actions with the notifications system using the Notifications actions registration API, and in this respect the remote apps themselves can define what actions can be performed in those applications. After registration, the notification system can display GUI widgets for accessing the registered actions with respect to a particular external application, as further described herein for FIG. 7.

FIG. 5 illustrates an example graphical user interface that may be generated for collaborative interaction with a set of electronic documents, messages and notifications, with superimposition of an example notification-task panel that may be displayed using an embodiment, and including a set of notifications.

In an embodiment, when the notifications-task control 404 is manipulated to select the notifications button 406, a list of zero or more notifications items 502, 504 is displayed in a notifications view 501 of the panel 402. In various embodiments, there may be any number of items 502, 504. Each of the items 502, 504 may comprise brief summaries of alerts, events or other messages indicating that content has been shared, comments about content, tasks, approval indications or likes, mentions of the user or the user computer, or other notifications. In an embodiment, in data storage device 50, a notification item 502, 504 may be represented as: an item title; an action icon with an aggregation indicator or statement; an action that was taken (e.g., "Sven Peters commented on this"), a description or content. In general, a notification may be viewed as an instance of an action on a content item, where a content item is a page, issue, blog post, etc. An action may be a share, comment, mention or approval or Like.

Each of the items 502, 504 may have been received from any of the external applications 60, 62, or one of the functional units of collaboration computer 30. However, in notifications view 501 of panel 402, each item 502, 504 is depicted using a similar arrangement and format regardless of the source of the underlying data. Therefore, each of the items 502, 504 has a federated, integrated appearance even though source data for the items may have been received via events or notifications from completely different applications than the application or functional unit of collaboration computer 30 that generates the notifications view 501.

In an embodiment, items 502, 504 that have not been previously read by the user computer 10 are marked or displayed in a distinctive format, such as using boldface or highlighting. To support this function, a record for a notification item 502, 504 in the data storage device 50 may include a column value indicating whether the item has been read. Notification items 502, 504 may have different associated types that may be indicated using distinctive icons, fonts, font treatments, or other display indications. The icons, fonts, font treatments, and other display indications also may indicate or suggest a name or type of one of the external applications 60, 62 that is the source of the item 502, 504.

FIG. 7 illustrates an example of the notification-task panel of FIG. 5, with superimposition of a notification sub panel that includes a comment. FIG. 7 depicts an example in which a particular details control 703 of a particular notification item 702 is selected. The notification item 702 of panel 402 indicates partial notification content, such as "Wendy Bell commented on EOFY 2012: Choose your own adventure" where "EOFY 2012: Choose your own adventure" may be a content item, such as a wiki page, that the collaboration computer 30 manages. In response to receiving data indicating selection of the details control 703, the integrated notification unit 34 causes generating and displaying the particular notification—that is, the comment of Wendy Bell on the content item in this example—and a notifications detail panel 704 comprising a task control 706, content controls 708, comment panel 710, comment controls 712, reply field 714, and reply button 716.

In an embodiment, the task control 706 is configured to cause creating and storing a task to the data storage device 50 based upon the notification that is shown in detail panel 704. Thus, in the arrangement of FIG. 7 and with the logic implemented in configuration computer 30, upon receiving and viewing a notification from an external system, the user is not required to switch contexts to a task-related application—or even a separate task-related view—in order to create a task that corresponds to the notification. Instead, by selecting the task control 706, the user can immediately create a task for the user that is based upon the notification. Consequently, in an embodiment, creation of task records in a collaborative document management system is fully integrated into a system for receiving and viewing notifications from external applications.

In an embodiment, content controls 708 comprise: Open, Stop Watching, Like. Each of the content controls 708 may comprise a hyperlink which, when selected, causes the collaboration computer 30 to perform a corresponding action. For example, selecting Open causes displaying all comments, approvals or other data associated with a particular notification. Selecting Stop Watching may cause marking records in a database, on data storage device 50 or associated with external application 60, 62, that configure the system to cease providing notifications to the current user computer 10 relating to the other user who posted a particular comment or caused a particular notification, and/or relating to the associated content item, such as "EOFY 2012: Choose your own adventure" in this example. Thus, Watching may refer to users or content items. Selecting Like may cause creating a record in the data storage device indicating that a user associated with the current user computer 10 approved of the content item.

In an embodiment, comment panel 710 comprises detailed content for a particular comment relating to the content item shown in panel 704—in this case a comment of a particular user that includes a hyperlink. In an embodiment, comment controls 712 are configured as hyperlinks which, when selected, cause performing functions relating to the particular comment that is shown in comment panel 710.

In an embodiment, the comment controls 712 are: Open; Reply; Like. In an embodiment, selecting the Open link causes displaying all content of the comment shown in comment panel 710, in the event that not all the content fits in the then current display. The comment controls 712 may comprise actions that have been registered by the external applications 60, 62 using the Notification action registration API described above.

In an embodiment, selecting the Reply link causes creating and displaying the reply field 714 and reply button 716; entering text in the reply field and selecting the reply button causes creating and storing a record in a database, in the data storage device 50 or associated with external application 60, 62, for a reply comment. Entering reply comments provides a way to take immediate action on the comment shown in comment panel 710 or other items that are associated with a content item referenced in a notification item 702. In contrast, selecting the task control 706 enables taking deferred action by marking a notification as a task for later processing.

In an embodiment, selecting the Like link causes creating and storing a record in a database, in the data storage device 50 or associated with external application 60, 62, indicating approval or liking of the particular comment that is shown in the comment panel 710. Thus, in the configuration of FIG. 7, a user computer may indicate an approval or Like at two levels. At a first level, approval may be indicated for a content item, such as "EOFY 2012: Choose your own adventure" in FIG. 7 using controls 708. At a second level, approval may be indicated for a particular comment shown in comment panel 710 using controls 712. In an embodiment, the order of all notification items, such as notification items 502, 504, within the panel 501 (FIG. 5) may be based upon popularity as indicated by a number of Likes or other approval indications that have been stored in the data storage device 50 for the notification items 502, 504. In an embodiment, GUI 302 (FIG. 3) may include a Popular Items control which, when selected, displays notifications, comments, or other items ordered based upon popularity as indicated by a number of Likes or other approval indications that have been stored in the data storage device 50 for those items. In this context, entering a reply comment to a comment using field 714 and button 716 (FIG. 7) may contribute to popularity of a comment.

FIG. 7 shows a comment in the comment panel 710 merely to illustrate a clear example. In other embodiments, content in a similar panel may include information relating to a sharing, mention, or other interaction with the content item that is the subject of the notifications in panel 402.

2.2 Example Benefits of Certain Embodiments

It will be apparent from the description herein that the various embodiments provide a number of distinct benefits over prior approaches. As one example, using the techniques herein, a large number of diverse kinds of events and notifications from different external applications 60, 62 can become federated in a single collaborative information management system and accessible to collaboration computer 30. Consequently, user computer 10 is not required to interact directly with the external applications 60, 62 to view information relating to the application events 70; instead, the user may interact with a single user interface of the collaboration computer 30 to view data originated from a large number of other applications. Thus, embodiments may provide an in-app notifications system in which notifications generated from a large number of other applications may appear within a single collaborative document management application without requiring context-switching to use the other applications.

The same techniques may be implemented in the context of applications other than collaborative document management applications, and the use of a collaborative document management application is not required in all embodiments. For example, the notifications, approval and event listening techniques described herein could be embedded within a source code version management application, alone or in addition to a collaborative document management application, so that a user could view and access federated notifications and centralized tasks in either of the application. Further, the techniques herein may be implemented as a browser extension so that a user can access federated notifications and centralized tasks regardless of which website the user is visiting. The techniques herein also could be implemented in a command-line program that is configured to provide access to tasks while the user is working in the command line. The techniques herein also could be implemented in a desktop computer application configured to provide access to federated tasks and notifications even when the user is not using the browser or a client program that accesses a document management application, source code version management application, or other system that generates notifications, events and tasks.

Moreover, there is no requirement for the external applications 60, 62 to have compatibility with the collaboration computer 30 or the content in data storage device 50.

Moreover, creation of task records in a collaborative document management system is fully integrated into a system for receiving and viewing notifications from external applications. The user is not required to switch contexts to a task-related application—or even a separate task-related view—in order to create a task that corresponds to the notification. Instead, by selecting the task control 706, the user can immediately create a task for the user that is based upon the notification. This is useful and practical, for example, when the user wishes to view several notifications rapidly, but create tasks for notifications that are recognized as needing future action, review or attention. For example, in the context of collaborative software development, a notification may come from a software build application (e.g., external applications 60, 62) and a suggested action may be to re-run the build; the user may see the notification and then immediately create a task relating to an external application without leaving the notification or the overall context of the collaborative document management system.

3. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
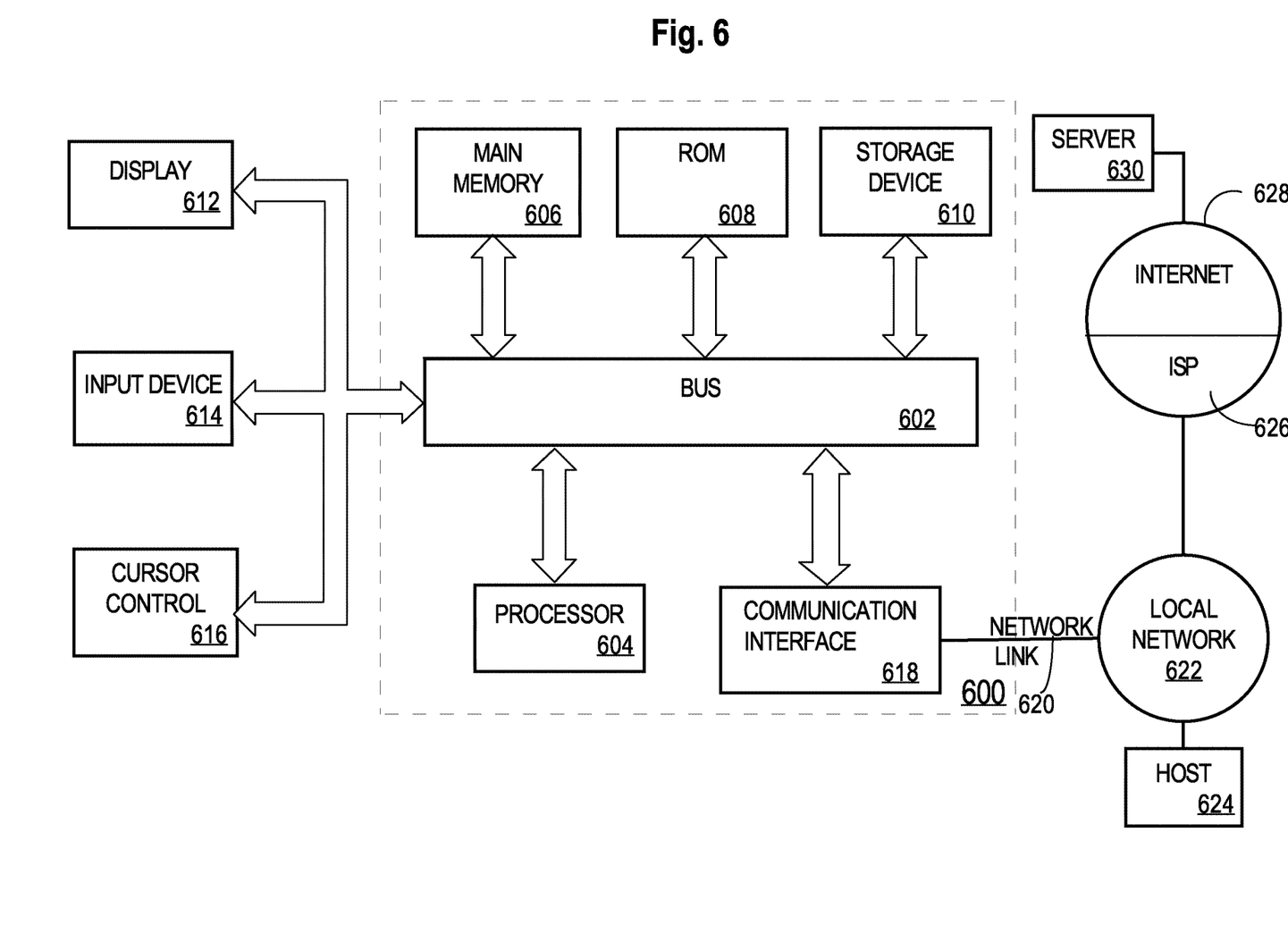
FIG. 6 illustrates a computer system with which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented data processing method comprising:
    in a collaborative electronic information management system that is hosted using a collaboration computer, establishing operation of a plurality of event listener units, each of the event listener units being configured to communicate with or listen for a plurality of application events that have been generated by a plurality of external applications;
    in response to a first event of the plurality of application events, generating a first notification item, the first event generated in response to an action taken with respect to a first content item managed by a first external application of the plurality of external applications, the first external application provided by a first program operating on at least one external computer;
    in response to a second event of the plurality of application events, generating a second notification item, the second event generated in response to an action taken with respect to a second content item managed by a second external application of the plurality of external applications, the second external application provided by a second program operating on the at least one external computer, the second program distinct from the first program;
    in a graphical user interface of the collaborative electronic information management system, causing display of:
        content of a particular content item that is managed in the collaborative electronic information management system; and
        a notification panel displayed contemporaneously with the content of the particular content item, the notification panel including a set of notifications comprising a first notification corresponding to the first notification item and a second notification corresponding to the second notification item;
    receiving a first input indicating selection of a particular notification displayed within the notification panel and, in response to the first input, generating and displaying a notification detail sub panel comprising details of the particular notification; and
    receiving a second input indicating selection of a content control that is associated with the particular notification and, in response to the second input, causing an action to be performed with respect to the particular content item associated with the particular notification, the particular content item managed by a particular application of the plurality of external applications.

2. The computer-implemented data processing method of claim 1, wherein:
    the content control comprises an open content control; and
    causing performance of the action with respect to the particular content item corresponds to the content control comprises generating and displaying all comments and approvals associated with the particular notification displayed in the notification detail sub panel.

3. The computer-implemented data processing method of claim 1, wherein the content control comprises a stop watching content control.

4. The computer-implemented data processing method of claim 3, wherein causing performance of the action with respect to the particular content item corresponds to the content control comprises marking records in a database associated with the collaborative electronic information management system that configure the collaborative electronic information management system to cease providing notifications relating to a user who posted a particular comment or caused the particular notification.

5. The computer-implemented data processing method of claim 3, wherein causing performance of the action with respect to the particular content item corresponds to the content control comprises marking records in a database associated with the collaborative electronic information management system that configure the collaborative electronic information management system to cease providing notifications relating to the particular content item.

6. The computer-implemented data processing method of claim 1, wherein:
the content control comprises a like content control; and
causing performance of the action with respect to the particular content item, the action corresponds to the content control comprises creating a record in a database associated with the collaborative electronic information management system that indicates that a user approved of the particular content item.

7. The computer-implemented data processing method of claim 1, wherein the particular content item is one of the first content item or the second content item, and
wherein the plurality of application events comprise any of:
a sharing item specifying that the particular content item was shared with a first user account;
a comment item specifying a comment on the particular content item;
a mention item indicating that the particular content item was mentioned in the second content item; or
an approval item indicating that the particular content item was liked or approved.

8. The computer-implemented data processing method of claim 1, wherein at least one of the one or more external applications is a social media application that is hosted at a computer other than the collaboration computer that hosts the collaborative electronic information management system.

9. The computer-implemented data processing method of claim 1, further comprising receiving a third input indicating selection of an approval control that is displayed in association with the content identifying the particular content item and, in response, updating a personal tasks list to indicate an approval of the particular content item.

10. The computer-implemented data processing method of claim 1, further comprising receiving a third input indicating selection of an approval control that is displayed in association with the particular notification and, in response, updating a personal tasks list to indicate an approval of the particular notification.

11. A computer system comprising:
one or more processors;
one or more non-transitory computer-readable storage media coupled to the one or more processors and storing sequences of instructions which, when executed using the one or more processors, cause performance of operations comprising:
in a collaborative electronic information management system that is hosted using a collaboration computer, establishing operation of a plurality of event listener units, each of the event listener units being configured to communicate with or listen for a plurality of application events that have been generated by a plurality of external applications;
in response to a first event of the plurality of application events, generating a first notification item, the first event generated in response to an action taken with respect to a first content item managed by a first external application of the plurality of external applications, the first external application provided by a first program operating on at least one external computer;
in response to a second event of the plurality of application events, generating a second notification item, the second event generated in response to an action taken with respect to a second content item managed by a second external application of the plurality of external applications, the second external application provided by a second program operating on the at least one external computer, the second program distinct from the first program;
in a graphical user interface of the collaborative electronic information management system, causing display of:
content of a particular content item that is managed in the collaborative electronic information management system; and
a notification panel displayed contemporaneously with the content of the particular content item, the notification panel including a set of notifications comprising a first notification corresponding to the first notification item and a second notification corresponding to the second notification item;
receiving a first input indicating selection of a particular notification displayed within the notification panel and, in response to the first input, generating and displaying a notification detail sub panel comprising details of the particular notification; and
receiving a second input indicating selection of a content control that is associated with the particular notification and, in response to the second input, causing an action to be performed with respect to the particular content item associated with the particular notification, the particular content item managed by a particular application of the plurality of external applications.

12. The computer system of claim 11, wherein:
the content control comprises an open content control; and
causing performance of the action with respect to the particular content item corresponds to the content control comprises generating and displaying all comments and approvals associated with the particular notification displayed in the notification detail sub panel.

13. The computer system of claim 11, wherein the content control comprises a stop watching content control.

14. The computer system of claim 13, wherein causing performance of the action with respect to the particular content item corresponds to the content control comprises marking records in a database associated with the collaborative electronic information management system that configure the collaborative electronic information management system to cease providing notifications relating to a user who posted a particular comment or caused the particular notification.

15. The computer system of claim 13, wherein causing performance of the action with respect to the particular content item corresponds to the content control comprises marking records in a database associated with the collaborative electronic information management system that configure the collaborative electronic information management system to cease providing notifications relating to the particular content item.

16. The computer system of claim 11, wherein:
the content control comprises a like content control; and
causing performance of the action with respect to the particular content item corresponds to the content control comprises creating a record in a database associated with the collaborative electronic information management system that indicates that a user approved of the particular content item.

17. The computer system of claim 11, wherein the particular content item is one of the first content item or the second content item, and
wherein the plurality of application events comprise any of:
a sharing item specifying that the particular content item was shared with a first user account;
a comment item specifying a comment on the particular content item;
a mention item indicating that the particular content item was mentioned in the second content item; or
an approval item indicating that the particular content item was liked or approved.

18. The computer system of claim 11, wherein at least one of the one or more external applications is a social media application that is hosted at a computer other than the collaboration computer that hosts the collaborative electronic information management system.

19. The computer system of claim 11, further comprising instructions which when executed cause performance of:
receiving a third input indicating selection of an approval control that is displayed in association with the content identifying the particular content item and, in response, updating a personal tasks list to indicate an approval of the particular content item.

20. The computer system of claim 11, further comprising instructions which when executed cause performance of:
receiving a third input indicating selection of an approval control that is displayed in association with the particular notification and, in response, updating a personal tasks list to indicate an approval of the particular notification.

* * * * *